Dec. 21, 1943.   A. R. THOMPSON   2,337,359
GENEVA DRIVE
Original Filed July 13, 1940
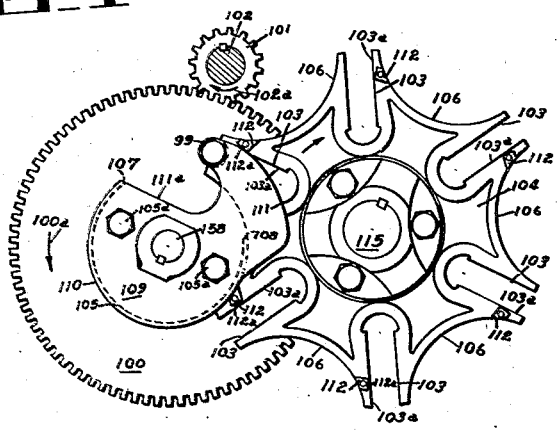
FIG_1
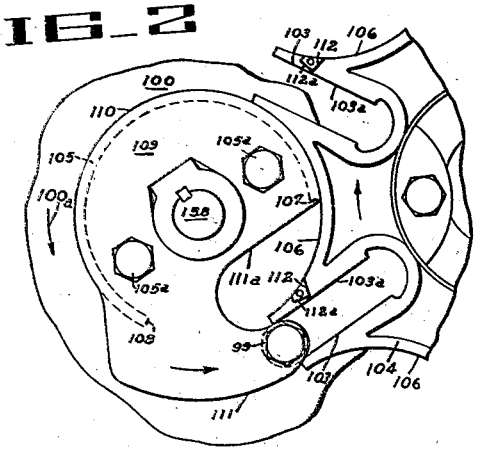
FIG_2
INVENTOR
ALBERT R. THOMPSON
BY Philip G. Minnis
ATTORNEY Patented Dec. 21, 1943

2,337,359

UNITED STATES PATENT OFFICE 2,337,359

GENEVA DRIVE

Albert R. Thompson, San Jose, Calif., assignor to Food Machinery Corporation, San Jose, Calif., a corporation of Delaware Original application July 13, 1940, Serial No. 345,335. Divided and this application December 7, 1942, Serial No. 468,027

4 Claims. (Cl. 74—436)

The present invention relates to a Geneva drive for translating a continuous rotation into an intermittent rotation.

This application is a division of my co-pending application, Serial No. 345,335, filed July 13, 1940, for Pear preparation machine.

One object of the present invention is to provide a drive mechanism for translating a continuous rotary movement into an accurate intermittent rotation.

Another object is to provide a Geneva drive for translating a continuous rotation into intermittent rotation wherein independent rotation of the Geneva wheel in either direction is prevented.

Another object is to provide a Geneva drive for translating a continuous rotation into intermittent rotation wherein any back-lash of the Geneva wheel is prevented.

Other and further objects and advantages of the present invention will become apparent from the following description and drawing in which:

Fig. 1 is a side view of the Geneva drive of the present invention.

Fig. 2 is an enlarged view of a portion of the Geneva drive shown in Fig. 1 illustrating the Geneva driver and its associated parts in another position.

The Geneva drive of the present invention (see Fig. 1) comprises a star or Geneva wheel 104 which is keyed to a driven shaft 115 for rotation therewith. The shaft 115 is rotatably mounted within bearings (not shown) in any convenient manner.

The star wheel 104 is provided with six radial slots 103 spaced 60 degrees apart and arcuate peripheral faces 106 intermediate the same. Secured to the star wheel 104 adjacent the leading sides 103a of each slot 103 is a lug 112. These lugs project from one side of the star wheel 104 and each of them is provided with a contact face 112a.

Rotatably mounted adjacent the star wheel 104 by means of a shaft 158 supported within bearings (not shown) is a gear 100 which intermeshes with a drive gear 101 keyed to a drive shaft 102.

Secured to the gear 100 for rotation therewith is a Geneva driver or pin 99 adapted to enter and leave successive slots 103 of the star wheel 104 upon rotation of the gear 100 to thereby effect intermittent rotation of the star wheel 104 and shaft 115 associated therewith.

The gear 100 is further provided with a cylindrical locking flange 105 adapted to engage the arcuate, peripheral faces 106 of the star wheel 104 to thereby lock the star wheel against rotation when it is at rest.

Secured to the gear 100 and the cylindrical flange 105 thereof by means of screws 105a is a plate 109 provided with an arcuate face or edge 110 which is flush with the peripheral face of the flange 105. The plate 109 is further provided with an arcuate face or edge 111 adjacent the driver 99 and adapted to engage the contact face 112a of the lugs 112 of the star wheel 104 previously referred to. The plate 109 is further provided with a cut out portion 111a intermediate the arcuate faces 110 and 111 so as to provide sufficient clearance between the lugs 112 and the plate 109 to permit rotation of the latter relative to the star wheel 104.

From the above it will be seen that upon continuous rotation of the drive shaft 102 and drive gear 101 in the direction of arrow 102a, in Fig. 1, gear 100, driver 99, flange 105 and plate 109 are continuously rotated in the direction of the arrow 100a. During each revolution of the gear 100 the driver 99 carried thereby enters one of the slots 103, see Fig. 2, rotates the star wheel 104 and shaft 115 60 degrees and leaves said slot when the same is in the position shown in Fig. 1. From the time the driver 99 leaves said slot until it enters the next slot 103 during the continuous rotation of gear 100, the star wheel 104 and shaft 115 are at rest. In this way, star wheel 104 and shaft 115 are intermittently rotated in a well known manner during the continuous rotation of shaft 102 and gears 101 and 100.

The segmental locking flange 105, which rotates with the gear 100, is so disposed with respect to the driver 99 that it does not interfere with the rotation of the Geneva wheel 104 during rotation of the same by the driver 99. This locking flange 105 is further so positioned and follows the Geneva driver 99 in such a manner that the peripheral face of the flange 105 rotatively engages successive arcuate faces 106 of the star wheel 104 following the slots 103 engaged by the driver 99 and thereby locks the star wheel against rotation after the driver 99 has left the respective slot 103. This locking action is well known in the art.

It should be noted, however, that when the Geneva drive is in the position shown, in Fig. 1, i. e., the driver 99 leaving the slot 103 and the star wheel 103 has just come to rest, the end 108 of the locking flange 105 is necessarily at a position coincident with or slightly below a straight line between the axes or centers of the shafts 158 and 115. This is for the reason that the star wheel 104 is in motion and cannot be locked against rotation until the driver 99 disengages from the slot 103. This position of the locking flange 105 may be called the dead center position. When the locking flange is in its dead center position (see Fig. 1), the star wheel 104 is not positively locked thereby against counterclockwise rotation, i. e., so far as the locking flange is concerned, the star wheel 104 may be rotated a slight distance in counter-clockwise direction until the outer edge of the end 108 of the flange 105 presses against the surface of the arcuate face 106 adjacent the same.

Therefore, when the driven shaft 115 is under load or operates a mechanism exerting resistance against rotation of the star wheel 104 in clockwise direction, the locking flange 105 cannot prevent a slight counter-clockwise rotation, i. e., backlash, of the star wheel 104 when the locking flange is at its dead center position, due to the incomplete locking action of the same at this time. Serious disadvantage, due to the backlash of the star wheel 104, as above described, is that no accurate positioning or indexing of the star wheel 104 and driven shaft 115 is obtained at the moment the driver 99 leaves the slot 103 and the locking flange 105 is at its dead center position. Consequently, heretofore Geneva drives could not be employed in connection with machines wherein an accurate intermittent motion without back-lash is required.

Continuing now with the description of the operation of the Geneva drive of the present invention, it should be noted that when the driver 99 leaves the slot 103 incident to the cessation of rotation of the star wheel 104 in clockwise direction (see Fig. 1), the arcuate peripheral face 111 of the plate 109 which rotates with the gear 100 and driver 99 engages one of the lugs 112 adjacent the same at this time and locks the star wheel 104 in accurately indexed position preventing any back-lash of the same in a counter clockwise direction.

While the gear 100, locking flange 105 and plate 109 continue their rotation in the direction of arrow 100a (see Fig. 1) the arcuate face 111 of plate 109 travels past the lug 112 in contact therewith and disengages therefrom only when the locking flange 105 is in engagement with the entire arcuate face 106 of the star wheel 104 adjacent the same. The star wheel is now held in accurately locked position by the engagement of the locking flange 105 with the respective arcuate face 106.

During further rotation of the gear 100, the driver 99 enters the next slot 103 when the other end 107 of the locking flange 105 is in the position shown in Fig. 2 and unlocks the star wheel 104 whereupon the operation of the star wheel 104 repeats in the same manner as described herein.

It will therefore be seen that the continuous rotation of shaft 102 and gears 101 and 100 is translated into an accurate intermittent rotation of the star wheel 104 and shaft 115 and that the star wheel 104 and shaft 115 are held and locked in accurately indexed position without any possibility of back-lash when the same are at rest.

While I have described a particular embodiment of the present invention, it will be understood that various changes and modifications may be made without departing from the spirit of the present invention and the scope of the appended claims.

Having described my invention and in what manner the same may be used, what I claim as new and desire to protect by Letters Patent is:

1. A Geneva drive comprising a rotatable star wheel having a plurality of slots extending radially from the periphery thereof, a rotatable plate provided with a drive pin cooperable with the slots of said star wheel for intermittently rotating the star wheel, and a lug carried by the star wheel adjacent each slot thereof, said plate having an arcuate face whose center is the axis of rotation of the plate and being so arranged that said arcuate face comes into locking engagement with the lug adjacent the slot with which the drive pin is engaged just as the drive pin leaves the slot.

2. A Geneva drive comprising a rotatable star wheel having a plurality of slots extending radially from the periphery thereof and arcuate peripheral faces intermediate said slots, a rotary support adjacent said star wheel and having an arcuate edge concentric with the center of rotation of the support, a drive pin carried by said support for cooperation with said slots for intermittently rotating the star wheel, a segmental circular locking flange carried by said support for intermittently engaging the arcuate faces of the star wheel for locking said star wheel against rotation during its rest periods, and a plurality of lugs carried by said star wheel in such positions that one of said lugs is engaged by the arcuate edge of said rotary support just as the drive pin terminates cooperation with a slot whereby to lock said star wheel against backlash.

3. A Geneva drive comprising a rotatable star wheel having a plurality of slots extending radially from the periphery thereof and arcuate peripheral faces intermediate said slots, a rotatable driver cooperating with the star wheel and slots thereof for intermittently rotating the star wheel, a segmental circular locking flange rotatable with the driver for rotatively engaging one of the arcuate faces of the star wheel for locking the star wheel against rotation when it is at rest during its intermittent operation, and means for preventing back-lash of the star wheel upon cessation of its rotation including a lug on the star wheel projecting laterally therefrom and a locking plate associated with the driver having an arcuate face engaging said lug at the instant when said star wheel comes to rest.

4. A Geneva drive comprising a rotatable star wheel having a plurality of slots extending radially from the periphery thereof and arcuate peripheral faces intermediate said slots, a rotatable driver cooperating with the star wheel and slots thereof for intermittently rotating the star wheel, a segmental circular locking flange rotatable with the driver for rotatively engaging one of the arcuate faces of the star wheel for locking the star wheel against rotation when it is at rest during its intermittent operation, and means for preventing back-lash of the star wheel upon cessation of its rotation, said means including a lug on the star wheel positioned adjacent each slot thereof and projecting laterally therefrom and a locking plate associated with the driver and rotatable therewith having an arcuate face defining the arc of a circle about the center of rotation of the driver for engaging said lug instantaneously when said star wheel comes to rest.

ALBERT R. THOMPSON.